United States Patent
Takita et al.

(10) Patent No.: US 6,637,653 B1
(45) Date of Patent: Oct. 28, 2003

(54) METHOD OF MEASURING COERCIVE FORCE OF A MAGNETIC CARD

(75) Inventors: Yukihiko Takita, Nagano (JP); Yoshiharu Uemura, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/831,136

(22) PCT Filed: Nov. 19, 1999

(86) PCT No.: PCT/IB99/01848

§ 371 (c)(1),
(2), (4) Date: May 4, 2001

(87) PCT Pub. No.: WO00/31684

PCT Pub. Date: Jun. 2, 2000

(30) Foreign Application Priority Data

Nov. 19, 1998 (JP) .............................. 10-329723

(51) Int. Cl.[7] ................................................. G06K 7/08
(52) U.S. Cl. ...................... 235/449; 235/493; 235/457; 235/450
(58) Field of Search ................................ 235/449, 493, 235/457, 380, 492, 450

(56) References Cited

U.S. PATENT DOCUMENTS 4,249,167 A * 2/1981 Purinton et al. .......... 340/572.2
4,977,040 A * 12/1990 Yano et al. ................. 428/692
5,414,567 A * 5/1995 Amada et al. ................ 386/29
5,648,160 A * 7/1997 Kishimoto et al. ......... 428/328
5,720,500 A * 2/1998 Okazaki et al. .............. 283/82
5,798,896 A * 8/1998 Araki et al. ................ 360/324
6,141,161 A * 10/2000 Sato et al. ...................... 360/2
6,189,791 B1   2/2001 Takita et al.

* cited by examiner

Primary Examiner—Michael G. Lee
Assistant Examiner—Allyson Sanders
(74) Attorney, Agent, or Firm—Notaro & Michalos P.C.

(57) ABSTRACT

A method for judging coercive force of a magnetic card to judge coercive force of a magnetic card to be used. According to the method for judging coercive force of a magnetic card for reproducing or recording magnetic information formed on a low coercive force card or a high coercive force card inserted from a card slot by a magnetic head, after erasing data of an inserted card by an electric current capable of erasing data of only a low coercive force card (step S32), the data of the card is reproduced (step S33), the inserted card is judged as the low coercive force card (step S36) if the data has been destroyed (No at the step S34). Destruction of the data is judged based on the number of times of flux reversal of the reproduced data or by a fact that specific data (STX code) which should be recorded on a predetermined card is not recognized.

13 Claims, 8 Drawing Sheets

METHOD OF MEASURING COERCIVE FORCE OF A MAGNETIC CARD

FIELD OF THE INVENTION

The present invention relates to a method for judging coercive force of a magnetic card. More particularly, the present invention relates to a method for judging coercive force of a magnetic card, which is preferable for a magnetic card reader having a function for automatically judging a level of coercive force of a magnetic card.

BACKGROUND OF THE INVENTION

It has been conventionally general to use magnetic cards having the same coercive force in a magnetic card reader. That is, the coercive force of the magnetic card to be used is previously specified by a signal from a host device, and the magnetic cards with two or more types of the coercive force are not designed to be processed by the same magnetic card reader.

In recent years, the coercive force of the magnetic card tends to be increased. For example, there is a tendency such that a low coercive force card having the coercive force of 300 Oe is switched to a high coercive force card having the coercive force of 2750 Oe. Thus, there is a possibility that both the low coercive force card and the high coercive force card may be simultaneously used in a transition period. In general, in case of writing data on the magnetic cards having the different types of coercive force, a suitable card output can not be obtained unless an appropriate write electric current according to the coercive force is set. Therefore, in order to set an appropriate write electric current in accordance with the coercive force of the magnetic card irrespective of a command from a host device, the magnetic card reader must be provided with a function for making judgment upon whether the magnetic card is a high coercive force card or a low coercive force card.

It is, therefore, an object of the present invention to provide a method for judging coercive force of a magnetic card, which can judge the coercive force of a magnetic card used based on an inserted card.

SUMMARY OF THE INVENTION

To achieve this aim, according to the present invention defined in claim 1, there is provided a method for judging coercive force of a magnetic card for reproducing or recording magnetic information formed on a low coercive force card or a high coercive force card inserted from a card slot by a magnetic head, wherein after erasing data of the inserted card by an electric current capable of erasing data of only a low coercive force card, data of the card is reproduced and the inserted card is determined as a low coercive force card when the data has been destroyed. Therefore, the coercive force of the magnetic card is determined by judging upon whether the data has been destroyed by the electric current capable of erasing data of only the low coercive force card. Further, since the function for judging the coercive force of the card can be provided to the magnetic card reader in this way, it is possible to provide the magnetic card reader which can execute the write processing by using an appropriate write current with respect to each card.

Further, according to the present invention defined in claim 2, there is provided a method for judging coercive force of a magnetic card for detecting whether a card inserted from a card slot is a low coercive force card and reproducing or recording magnetic information formed on the card by a magnetic head, wherein after erasing data of the inserted card by an electric current capable of erasing data of only a low coercive force card, data of the card is reproduced and the inserted card is determined as a low coercive force card when the data has been destroyed. Therefore, judgment is made upon whether the inserted card is the low coercive force card or any card other than the low coercive force card based on whether data has been destroyed by the electric current capable of erasing data of only the low coercive force card.

In these cases, it is desirable that the destruction of the data is judged by the number of times of flux reversal of reproduced data or by no recognition of specific data which should be recorded in a predetermined card as in the method for judging the coercive force of the magnetic card according to the present invention defined in claim 3. In such a case, when the number of times of flux reversal of reproduced data is smaller than the usual number of times of flux reversal according to recording density of a magnetic stripe, or when specific data which should be recorded is not recognized, it is considered that the data has been destroyed, thereby making judgment upon whether the inserted card is a low coercive force card.

That is, when the number of times of flux reversal of reproduced data is smaller than the usual number of times of flux reversal according to recording density of a magnetic stripe, or when specific data which should be recorded is not recognized, it is considered that the data has been destroyed, and hence it is possible to determine that the card is a low coercive force card in these cases.

Furthermore, according to the present invention defined in claim 4, there is provided a method for judging coercive force of a magnetic card for reproducing or recording magnetic information formed on a low coercive force card or a high coercive force card inserted from a card slot by a magnetic head, wherein after rewriting data on the inserted card by an electric current capable of rewriting data of only the low coercive force card, data of the card is reproduced, and the inserted card is determined as the low coercive force card when the data has been destroyed. Therefore, the coercive force of the magnetic card can be judged based on whether the data has been destroyed by rewriting the data by an electric current capable of rewriting data of only the low coercive force card. Further, since a function for judging the coercive force of the data can be provided to the magnetic card reader, it is possible to provide the magnetic card reader which can be subjected to the write processing by a write electric current appropriate for each card.

In this case, it is desirable to judge destruction of the data by the fact that specific data which should be recorded on a predetermined card is not recognized as in the method for judging the coercive force of the magnetic card according to the present invention defined in claim 5. In such a case, it can be considered that the data has been destroyed when the specific data which should be recorded is not recognized, thereby making judgment upon whether the card is the low coercive force card.

That is, since it can be considered that the data has been destroyed if the specific data which should be recorded is not recognized, it is possible to determined the card as the low coercive force card.

Further, according to the present invention defined in claim 6, there is provided a method for judging coercive force of a magnetic card for detecting whether a card inserted from a card slot is a low coercive force card and reproducing or recording magnetic information formed on the card by a magnetic head, wherein after rewriting data of the inserted card by an electric current capable of rewriting data of only the low coercive force card, the data of the card is reproduced, and the inserted card is determined as the low coercive force card if the data has been destroyed. Therefore, judgment is made upon whether the card is the low coercive force card or any card other than the low coercive force card based on destruction of the data after rewriting the data by an electric current capable of rewriting data of only the low coercive force card.

Furthermore, according to the present invention defined in claim 7, there is provided a method for judging coercive force of a magnetic card for detecting whether a card inserted from a card slot is a high coercive force card and reproducing or recording magnetic information formed on the card by a magnetic head, wherein after rewriting data of the inserted card by an electric current capable of rewriting data of only the low coercive force card, the data of the card is reproduced, and the inserted card is determined as the high coercive force card when the data has not been destroyed. Accordingly, since data is not actually rewritten even if there is an attempt to rewrite data by using an electric current capable of rewiring data of only the low coercive force card, judgment is made upon whether the card is the high coercive force card or any card other than the high coercive force card based on the fact that data has been destroyed or not.

In such a case, as similar to the method for judging coercive force of a magnetic card according to the present invention defined in claim 8, it is desirable to judge the state of the data which has not been destroyed based on recognition of specific data which should be recorded on a predetermined card. In this case, it can be considered that the data has been destroyed if the data has been actually rewritten. Meanwhile, it can be considered that the data has not been destroyed if the data has not actually been rewritten. Thus, it is possible to make judgment upon whether the card is the high coercive force card or any card other than the high coercive force card.

In other words, since it can be considered that the data has not been destroyed when specific data which should be recorded is recognized, it is possible to determined that the card is the high coercive force card in this case.

Moreover, according to the present invention defined in claim 9, there is provided a method for judging coercive force of a magnetic card for reproducing or recording magnetic information formed on a low coercive force card or a high coercive force card inserted from a card slot by a magnetic head, wherein after erasing data of the inserted card by an electric current capable of erasing data of the low coercive force card and the high coercive force card, data is written by using an electric current capable of writing data of only the low coercive force card, and the inserted card is determined as the low coercive force card when the data is thereafter reproduced and an appropriate reproduction state is obtained. Therefore, the coercive force of the magnetic card is judged by whether the data written after being erased is appropriately reproduced. In addition, since the magnetic card reader can be provided with the function for judging the coercive force of the card in this manner, it is possible to provide the magnetic card reader which can execute the write processing by using an appropriate write electric current with respect to each card.

In this case, as in the method for judging coercive force of a magnetic card according to the present invention defined in claim 10, it is desirable to judge the appropriate reproduction state of data based on the number of times of flux reversal of the reproduced data or recognition of specific data which should be recorded on a predetermined card. In this case, when the number of times of flux reversal of the reproduced data is smaller than the usual number of times of flux reversal according to the recording density of a magnetic stripe, or when the specific data which should be recorded is not recognized, it can be considered that the reproduction state of the data is inappropriate, thereby making judgment upon whether the card is the low coercive force card.

That is, when the number of times of flux reversal of reproduced data is smaller than the number of times of flux reversal according to the recording density of a magnetic stripe, or when specific data which should be recorded can not be recognized, it can be considered that the reproduction state of data is inappropriate. In such a case the card can be determined as a high coercive force card.

Further, according to the present invention defined in claim 11, there is provided a method for judging coercive force of a magnetic card for detecting whether a card inserted from a card slot is a high coercive force card and reproducing or recording magnetic information formed on the card by a magnetic head, wherein after erasing data of the inserted card by an electric current capable of erasing data of a low coercive force card and a high coercive force card, data is written by an electric current capable of writing data of only the low coercive force card, and the inserted card is determined as a high coercive force card if appropriate reproduction is impossible when the data is reproduced. Therefore, the magnetic card is judged as the high coercive force card or any card other than the high coercive force card depending on whether the data written after the erasure can be appropriately reproduced.

In this case, as in the method for judging coercive force of a magnetic card according to claim 12, it is desirable to determine that appropriate reproduction is impossible when the number of times of flux reversal of a reproduction output is smaller than the usual number of times of flux reversal according to the recording density of a magnetic stripe. In this case, it can be considered that reproduction of data is inappropriate, i.e., reproduction is impossible when the number of times of flux reversal of the reproduced data is smaller than the usual number of times of flux reversal according to the recording density of the magnetic stripe. It is, therefore, possible to determine the card is a high coercive force card or any card other than the high coercive force card.

That is, if the number of times of flux reversal of the reproduction output is smaller than the usual number of times of flux reversal according to the recording density of the magnetic stripe, it can be considered that the reproduction state of the data is inappropriate, i.e., the appropriate reproduction is impossible. In such a case, it is possible to determine the card as a high coercive force card.

Further, according to the present invention defined in claim 13, there is provided a method for judging coercive force of a magnetic card for detecting whether a card inserted from a card slot is a low coercive force card and reproducing or recording magnetic information formed on the card by a magnetic head, wherein after erasing data of the inserted card by using an electric current capable of erasing data of a low coercive force card or a high coercive force card, data is written by using an electric current capable of writing data of only a low coercive force card, and the inserted card is then determined as a low coercive force card when the reproduction state is appropriate at the time of reproducing the data. Therefore, judgment is made upon whether the magnetic card is a low coercive force card or any card other than the low coercive force card based on whether the data written after erasure can be appropriately reproduced.

Further, as in the method for judging coercive force of a magnetic card according to claim 11, it is desirable that the reproduction state of the data is determined as the appropriate reproduction state when specific data which should be recorded on a predetermined card is recognized. In this case, it can be considered that the reproduction state of the data is appropriate when specific data which should be recorded is recognized, thereby determining the card as a low coercive force card or any card other than the low coercive force card.

That is, if the specific data is recognized during reproduction output, it can be considered that the reproduction state of the data is appropriate, i.e., the appropriate reproduction state is obtained, and hence the card can be determined as a low coercive force card.

BEST MODES FOR EMBODYING THE INVENTION

The structure of the present invention will now be described with reference to the illustrative best modes hereinafter.

Figure 1:
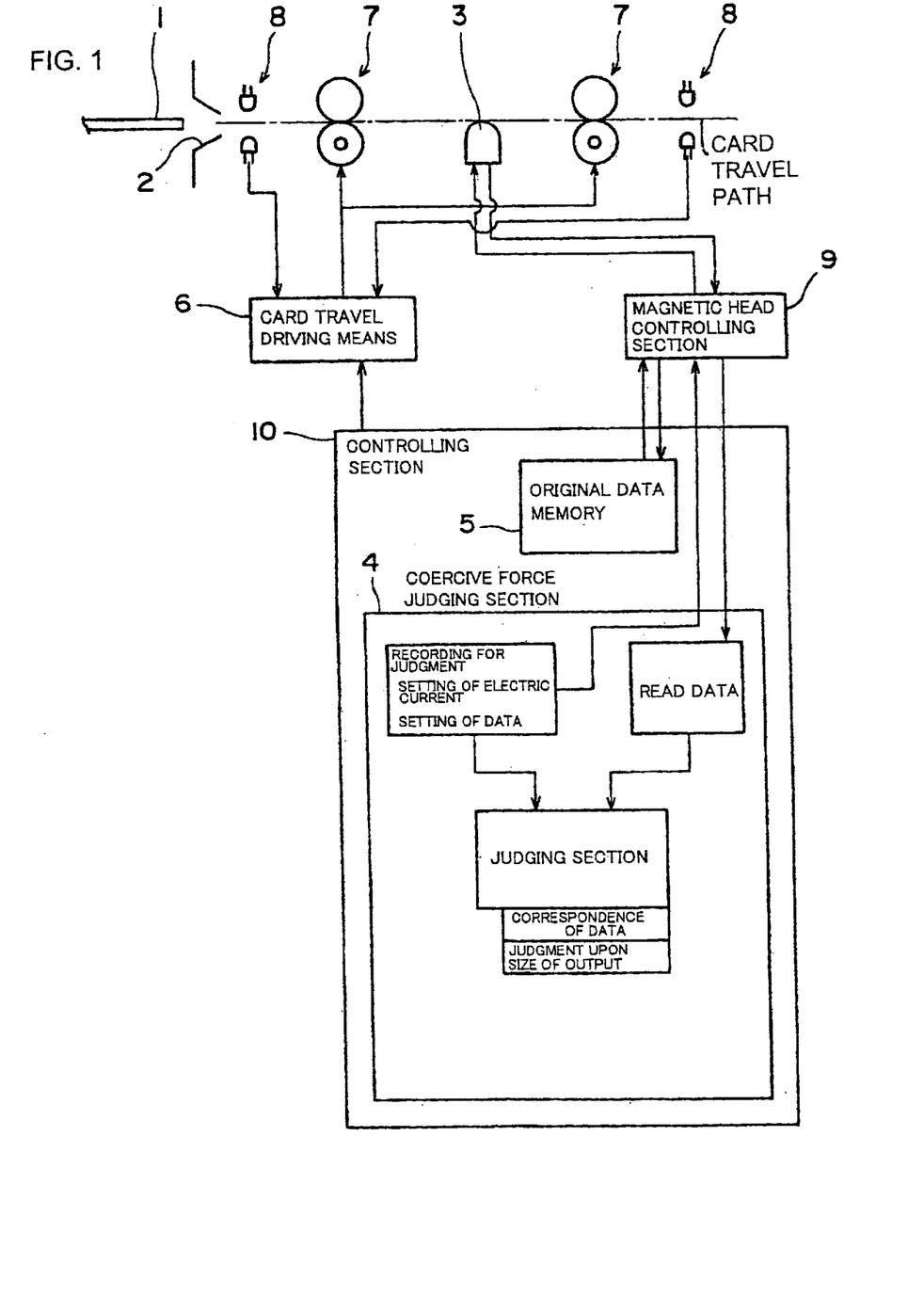
FIG. 1 is a schematic block diagram of a magnetic card reader embodying a method for judging coercive force of a magnetic card according to the present invention.

FIG. 1 shows an example of an embodiment of a magnetic card reader to which the present invention is applied. It is to be noted that the card reader according to this embodiment corresponds to, for example, a low coercive force card of 300 Oe and a high coercive force card of 2750 Oe.

The magnetic card reader is designed to reproduce or record magnetic information formed on a magnetic card 1 inserted from a card slot 2 by a magnetic head 3 and provided with judging means for judging coercive force of data tracks for recording the magnetic information. The judging means records or erases data by a predetermined electric current through the magnetic head 3 and has a coercive force judging section 4 for judging coercive force of the magnetic card 1 by reproducing that data. Further, a controlling section 10 has an original data memory (storing section) 5 for storing the data recorded on the data tracks before recording the data by a predetermined electric current.

The magnetic card 1 inserted from the card slot 2 is carried by a pair of rollers 7, 7 driven by card travel driving means 6. The card travel driving means 6 rotates the pair of rollers 7, 7 in both forward and backward directions based on signals from sensors 8, 8.

Figure 2:
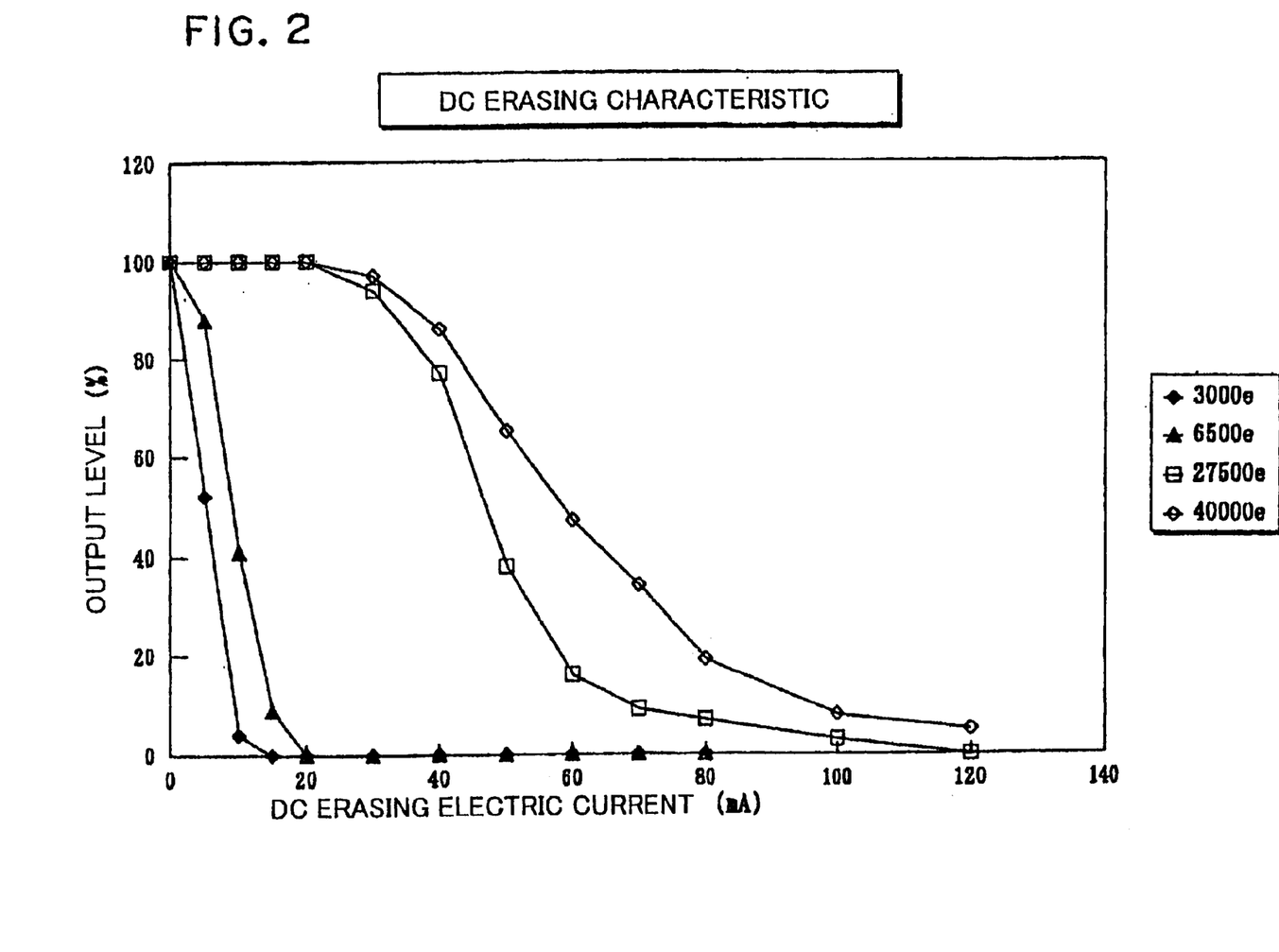
FIG. 2 is a view showing a DC erasing characteristic relative to each coercive force card of a magnetic head.

The magnetic head 3 is used for a high coercive force card of, e.g., 2750 Oe and can be also used for a low coercive card of 300 Oe by changing intensity of an electric current. This magnetic head 3 is a magnetic head having recording and reproducing functions and controlled by a magnetic head controlling section 9. FIG. 2 shows a DC erasing characteristic of the magnetic head 3 relative to a card having each coercive force (300, 650, 2750, 4000 Oe). It is apparent from FIG. 2 that an electric current capable of erasing data of only the low coercive force card (300 Oe) is approximately 20 to 30 mA and an electric current capable of erasing data of both the low coercive force card and the high coercive force card (2750 Oe) is not less than 120 mA.

Figure 3:
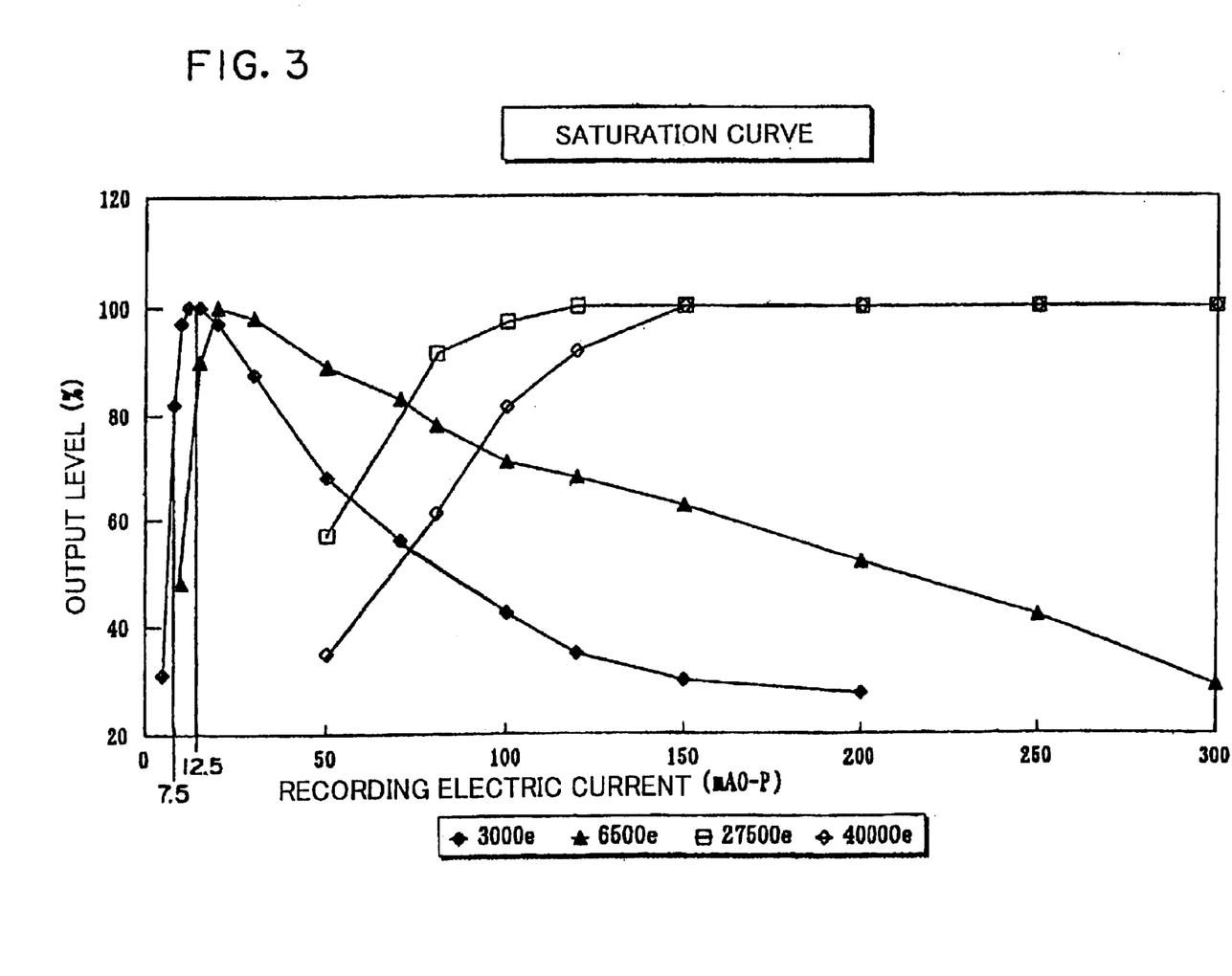
FIG. 3 is a view showing a saturation characteristic of each coercive force card.

Further, FIG. 3 illustrates a saturation characteristic of a card having each coercive force. The saturation electric current of the low coercive force card (300 Oe) is 12.5 mA 0-p (zero-peak). It is general to set the write electric current to approximately 1.5- to 3-fold of the saturation electric current value, taking into consideration a margin and the like of a write capability of the magnetic head 3. According to the regulations for the high coercive force card of ISO, it is determined that the write operation is carried out with an electric current which is 2.5- to 3.5-fold of the electric current (7.5 mA) by which an output corresponding to 80% of the saturation electric current value can be obtained and a test of the card is executed. Therefore, approximately 7.5×3=22.5 mA 0-p is an electric current value capable of writing data of only the low coercive force card.

Description will now be given as to a method for judging the coercive force of the magnetic card 1. The controlling section 10 executes a program described below to judge the coercive force.

Figure 4:
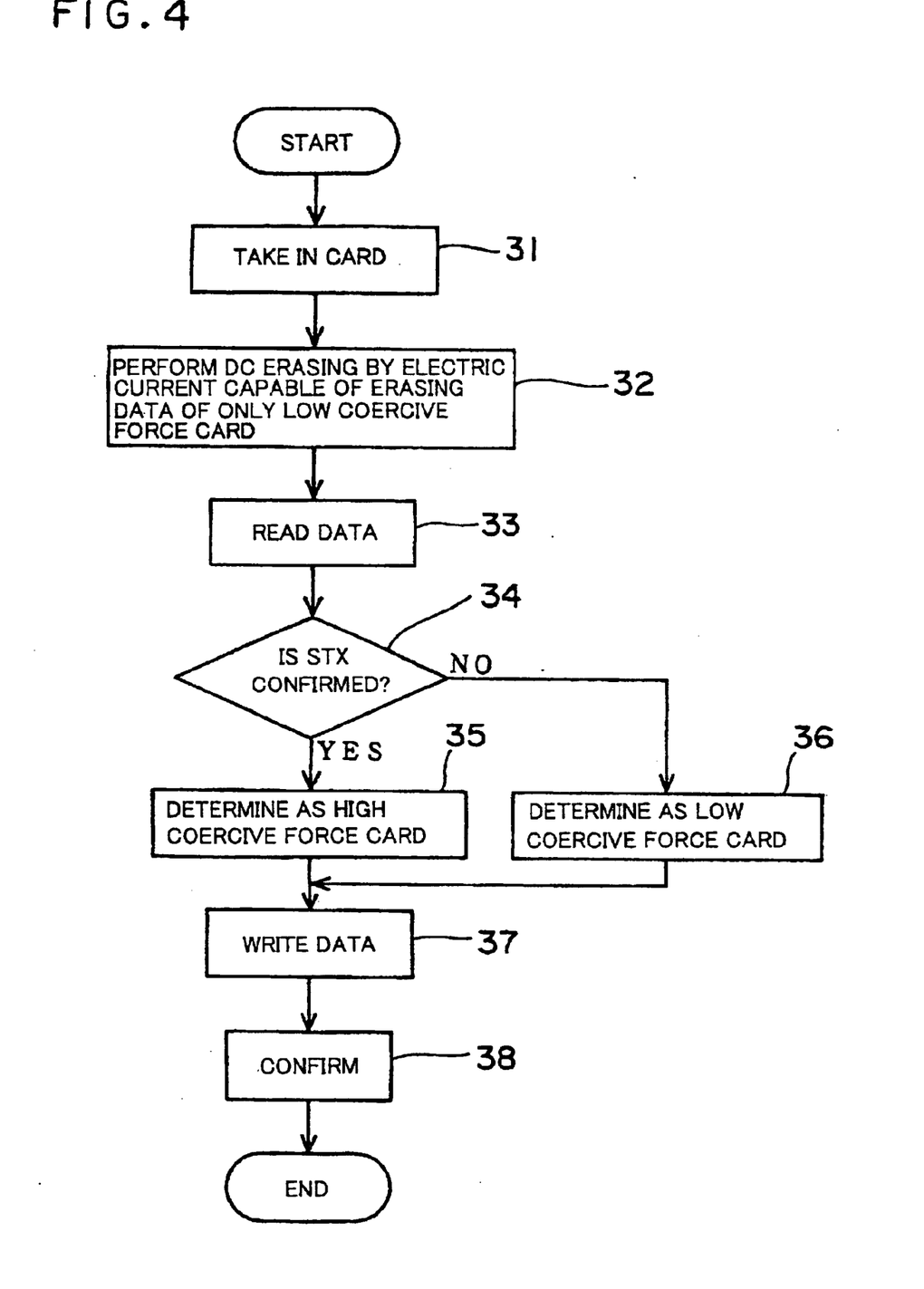
FIG. 4 is a flowchart showing a first embodiment of a method for judging coercive force of a magnetic card according to the present invention.

A first method shown in FIG. 4 is a method for judging coercive force of the magnetic card 1 for reproducing or recording the magnetic information formed on the low coercive force card or the high coercive force card inserted from a card slot 2 by the magnetic head 3. According to this method, after data of the inserted card is erased by an electric current capable of erasing data of only the low coercive force card, the data of the card is reproduced. If the data has been destroyed, the inserted card is judged as the low coercive force card. Destruction of the data is judged by the fact that specific data which should be recorded on a predetermined card is not recognized.

Giving concrete description as to an example where the data is written on the magnetic card 1, after the magnetic card 1 is taken from the card slot 2 (step S31), DC (direct-current) erasing is executed by using an electric current capable of erasing data of only the low coercive force card, e.g., an electric current of 20 mA (step S32). Subsequently, 30% of slicing is applied to the data of the magnetic card 1 so that the data is read (step S33). That is, of the output waveform, not less than 30% of the output waveform is read.

Here, in case of generally recording data on the magnetic card 1, a STX (start of text: a transmission control character used as a first character of a text) code is recorded together as specific data, for example. Therefore, if the recorded data has not been destroyed by DC erasing at the step S32, existence of the STX code can be recognized in the read data. On the other hand, if the data has been destroyed, existence of the STX code can not be recognized in the read data. Since DC erasing is carried out by an electric current capable of erasing data of only the low coercive force card at the step S32, data is not destroyed if the magnetic card 1 is the high coercive force card taken from the card slot 2. However, data is destroyed, if the card is the low coercive force card.

Therefore, if the STX code is confirmed in the read data, the processing proceeds from the step S34 to the step S35 where the magnetic card 1 is judged as the high coercive force card. Further, a value of the write electric current is switched to an electric current value for the high coercive force card, e.g., 200 mA 0-p. On the other hand, if the STX code is not confirmed in the read data, the processing proceeds from the step S34 to S36 where the magnetic card 1 is judged as the low coercive force card, and a value of the write electric current is switched to an electric current for the low coercive force card, e.g., 22.5 mA 0-p.

Subsequently, at the step S37, the data is written by using an electric current having the switched value. At the step S38, 30% of slicing is applied to the written data to again read the data. Further, confirmation is made on whether the reread data coincides with the written data, and the program is thereafter terminated. Incidentally, although the STX code is used as specific data in the above-described example, it is needless to say that the present invention is not restricted to the STX code.

After making judgment upon whether the magnetic card 1 is the low coercive force card or the high coercive force card in this manner, the data is written by using an appropriate write electric current for each card. Therefore, even if the high coercive force card and the low coercive force card are mixed to be distributed to the market, the coercive force of the card can be automatically judged, and the same card reader can be used to process these magnetic cards. In other words, since the magnetic card reader can be provided with a function for judging coercive force of a card, it is possible to provide a magnetic card reader capable of performing the write processing by using a write electric current appropriate to each card.

A second method will now be described with reference to FIG. 5. This method is different from the first method in how to judge upon whether the read data has been destroyed. That is, destruction of the data is judged based on the number of times of flux reversal of the reproduced data.

Giving concrete description as to an example where the data is written on the magnetic card 1, after the magnetic card 1 is first taken from the card slot 2 (step S41), DC erasing is performed by using an electric current capable of erasing data of only the low coercive force card, for example, an electric current of 20 mA (step S42). Subsequently, 30% of slicing is applied to the data of the magnetic card 1 so that the data is read (step S43). At this time, the number of times of flux reversal of the data is counted.

Then, at the step S44, the number of times of flux reversal of the read output is compared with the usual number of times of flux reversal according to the recording density of the magnetic stripe. If the data recorded on the magnetic stripe has been destroyed by DC erasing at the step S42, the number of times of flux reversal of the read output must be smaller than that in the usual case. If it has not been destroyed, it can not be said that the number of times of flux reversal of the read output is smaller than that in the usual case. At the step S42, since DC erasing is carried out by using an electric current capable of erasing data of only the low coercive force card, the data is not destroyed if the magnetic card 1 taken from the card slot 2 is the high coercive force card. The data is destroyed, if the magnetic card 1 is the low coercive force card.

Therefore, if the number of times of flux reversal of the read data is smaller than that in the usual case and it can be considered that the data has been destroyed, the processing proceeds from the step S44 to the step S45 to judge the magnetic card 1 as the low coercive force card, and the write electric current is switched to the electric current having a value for the low coercive force card. On the other hand, if it can not be said that the number of times of flux reversal of the read data is smaller than that in the usual case and it can be considered that the data has not been destroyed, the processing proceeds from the step S44 to the step S46 to judge the magnetic card 1 as the high coercive force card, and the write electric current is switched to the electric current having a value for the high coercive force card.

Thereafter, the data is written by using the switched electric current at the step S47. At the step S48, 30% of slicing is applied to the written data to again read the data, and conformation is made on whether the reread data coincides with the written data to then terminate the program.

Incidentally, although the above-described first and second methods make judgment upon whether the inserted card is the low coercive force card or the high coercive force card, the present invention is not restricted to judgment upon whether the inserted card is the low coercive force card or the high coercive force card in this manner. For example, at the step S36 in FIG. 4, if the STX code is not recognized, the inserted card may be determined as a card other than the high coercive force card and judgment may be further made upon whether this card is the low coercive force card or any other card. This processing can be similarly performed at the step S45 in FIG. 5.

Figure 6:
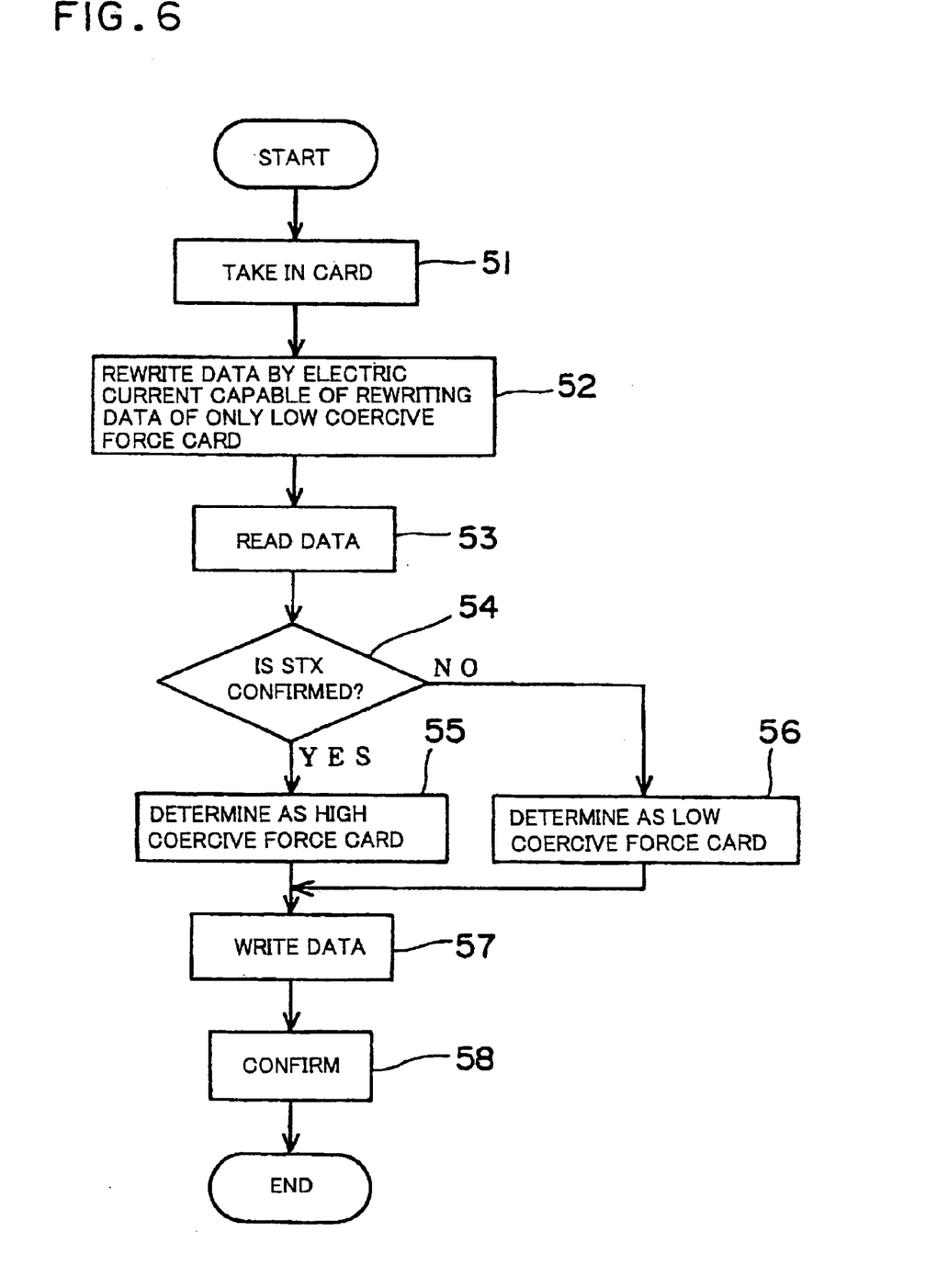
FIG. 6 is a flowchart showing a third embodiment of a method for judging coercive force of a magnetic card according to the present invention.

Subsequently, description will now be given as to a third method with reference to FIG. 6. This method is a method for judging coercive force of the magnetic card, by which magnetic information formed on the low coercive force card or the high coercive force card inserted from the card slot 2 is reproduced or recorded by the magnetic head 3. According to this method, after the data of the inserted card is rewritten by an electric current capable of rewriting data of only the low coercive force card, the data of the card is reproduced, and the inserted card is judged as the low coercive force card if the data has been destroyed. Destruction of the data is judged by the fact that specific data which should be recorded on a predetermined card can not be recognized.

Giving concrete description as to an example where the data is written on the magnetic card 1, after the magnetic card 1 is first taken from the card slot 2 (step S51), data other than the STX code is rewritten by an electric current capable of rewriting data of only the low coercive force card (step S52). 30% of slicing is then applied to the rewritten data of the magnetic card 1 so that the data is read (step S53). If the STX code is confirmed in the read data for the reason similar to that of the method in FIG. 4, the processing proceeds from the step S54 to the step S55, and the magnetic card 1 is judged as the high coercive force card. Furthermore, the write electric current is switched to an electric current having a value for the high coercive force card. On the other hand, if the STX code is not confirmed in the read data, the processing proceeds from the step S54 to the step S56 to determine the magnetic card 1 as the low coercive force card, and the write electric current is switched to an electric current having a value for the low coercive force card.

Thereafter, at the step S57, the data is written by using an electric current having the switched value. At the step S58, 30% of slicing is applied to the written data to again read the data, and confirmation is made on whether the reread data coincides with the written data to then terminate the program.

In this connection, although the above-described third method makes judgment upon whether the inserted card is the low coercive force card or the high coercive force card, the present invention is not restricted to judgment upon whether the inserted card is the low coercive force card or the high coercive force card. For example, judgment may be made upon whether the inserted card is the low coercive force card or any other card than the low coercive force card. For example, at the step S56 in FIG. 6, if the STX code is not recognized, the inserted card may be determined as a card other than the high coercive force card, and judgment is further made upon whether this card is the low coercive force card or any card other than the low coercive force card.

Figure 7:
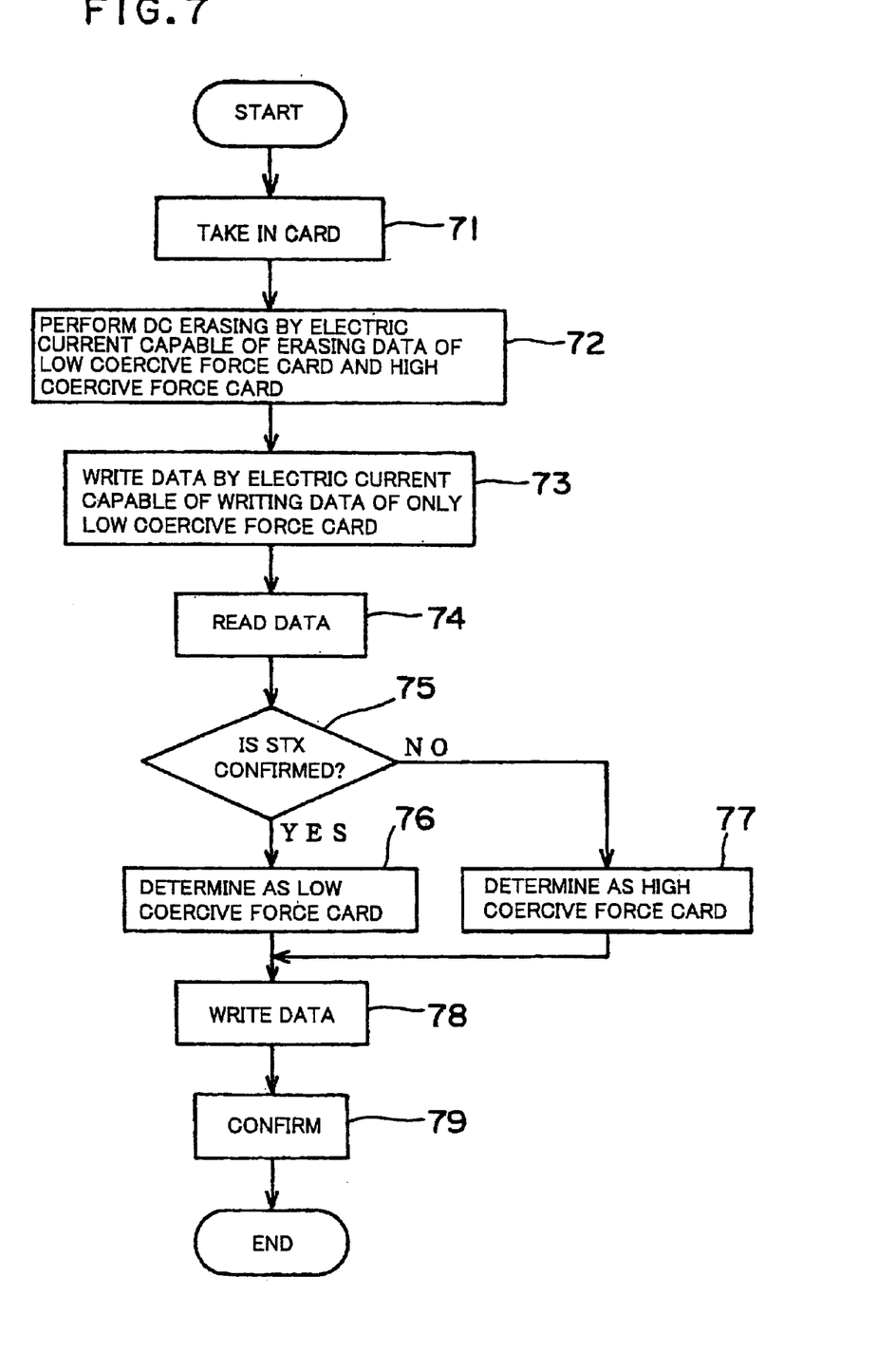
FIG. 7 is a flowchart showing a fourth embodiment of a method for judging coercive force of a magnetic card according to the present invention.

A fourth method will now be described with reference to FIG. 7. This method is a method for judging coercive force of the magnetic card, by which magnetic information formed on the low coercive force card or the high coercive force card inserted from the card slot 2 is reproduced or recorded by the magnetic head 3. According to this method, after data of the inserted card is erased by using an electric current capable of erasing data of the low coercive force card or the high coercive force card, data is written by an electric current capable of writing data of only the low coercive force card. Thereafter, if the reproduction state is appropriate when that data is reproduced, the inserted card is determined as the low coercive force card. The appropriate data reproduction state is judged by the fact that specific data which should be recorded on a predetermined card is not recognized. =p Giving concrete description as to the case where the data is written on the magnetic card 1, after the magnetic card 1 is first taken from the card slot 2 (step S71), DC erasing of the data is performed by using an electric current capable of erasing data of the low coercive force card and the high coercive force card, e.g., an electric current of 120 mA (step S72). Subsequently, after writing the data by using an electric current capable of writing data of only the low coercive force card, e.g., an electric current of 22.5 mA 0-p (step S73), 30% of slicing is applied to this data to be read (step S74). Moreover, if the STX code is confirmed in the read data, the processing proceeds from the step S75 to the step S76 to determine the magnetic card 1 as the low coercive force card, and the write electric current is switched to an electric current having a value for the low coercive force card. On the other hand, if the STX code is not confirmed in the read data, the processing proceeds from the step S75 to the step S77 to determine the magnetic card 1 as the high coercive force card, and the write electric current is switched to an electric current having a value for the high coercive force card.

Thereafter, at the step S78, the data is written by using the switched electric current. At the step S79, 30% of slicing is applied to the written data to again read the data, and confirmation is made on whether the reread data coincides with the written data to then terminate the program.

A fifth method will now be described with reference to FIG. 8. This method is different from the fourth method in how to make judgment upon possibility of appropriate reproduction. That is, the appropriate data reproduction state is judged based on the number of times of flux reversal of the reproduced data.

Giving concrete description as to the case where the data is written on the magnetic card 1, after the magnetic card 1 is first taken from the card slot 2 (step S81), DC erasing of the data is performed by using an electric current capable of erasing data of the low coercive force card and the high coercive force card (step S82). Subsequently, after writing the data by an electric current capable of writing data of only the low coercive force card (step S83), 30% of slicing is applied to this data to read the data (step S84). At this time, the number of times of flux reversal of the data is counted.

If the number of times of flux reversal of the read data is smaller than the usual number of times of flux reversal according to recording density of the magnetic stripe, reproduction is judged as inappropriate. Further, the processing proceeds from the step S85 to the step S86 to determine the magnetic card 1 as the high coercive force card, and the write electric current is switched to an electric current having a value for the high coercive force card. On the other hand, if it can not be said that the number of times of flux reversal of the read data is smaller than the usual number of times of flux reversal according to recording density of the magnetic stripe, reproduction is judged as appropriate. Further, the processing proceeds from the step S85 to the step S87 to determine the magnetic card 1 as the low coercive force card, and the write electric current is switched to an electric current having a value for the low coercive force card.

Thereafter, data is written by using the switched electric current at the step S88, and 30% of slicing is applied to the written data to again read the data at the step S89. Furthermore, confirmation is made on whether the reread data coincides with the written data, and this program is then terminated.

Incidentally, although the above-described modes are an example of preferred embodiments according to the present invention, the present invention is not restricted thereto, and various modifications and variations can be made without departing from the scope of the invention. For example, although the low coercive force card having 300 Oe and the high coercive force card having 2750 Oe are discriminated in the above description, it is needless to add that the intensity of the coercive force is not restricted to these values.

Figure 5:
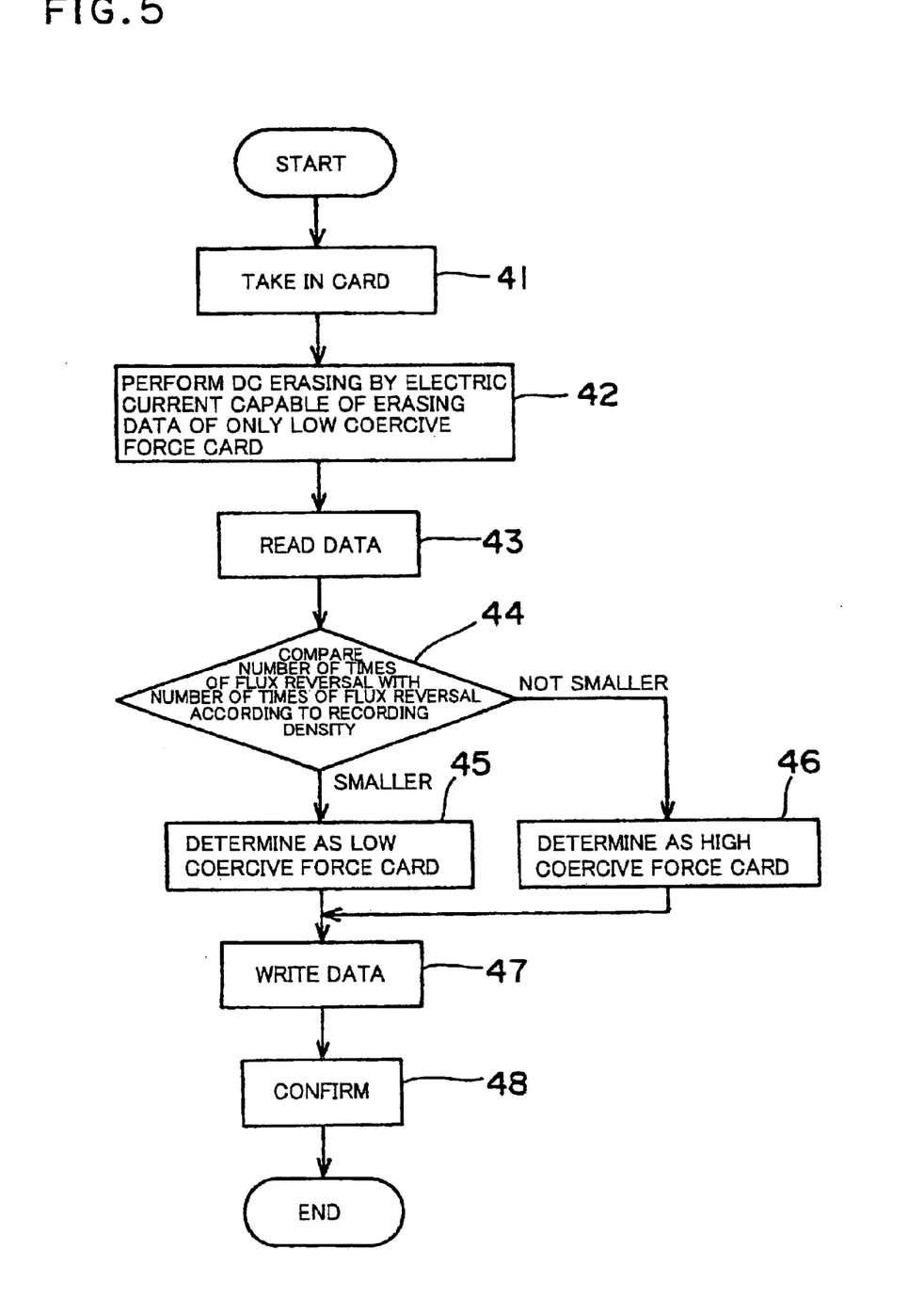
FIG. 5 is a flowchart showing a second embodiment of a method for judging coercive force of a magnetic card according to the present invention.
Figure 8:
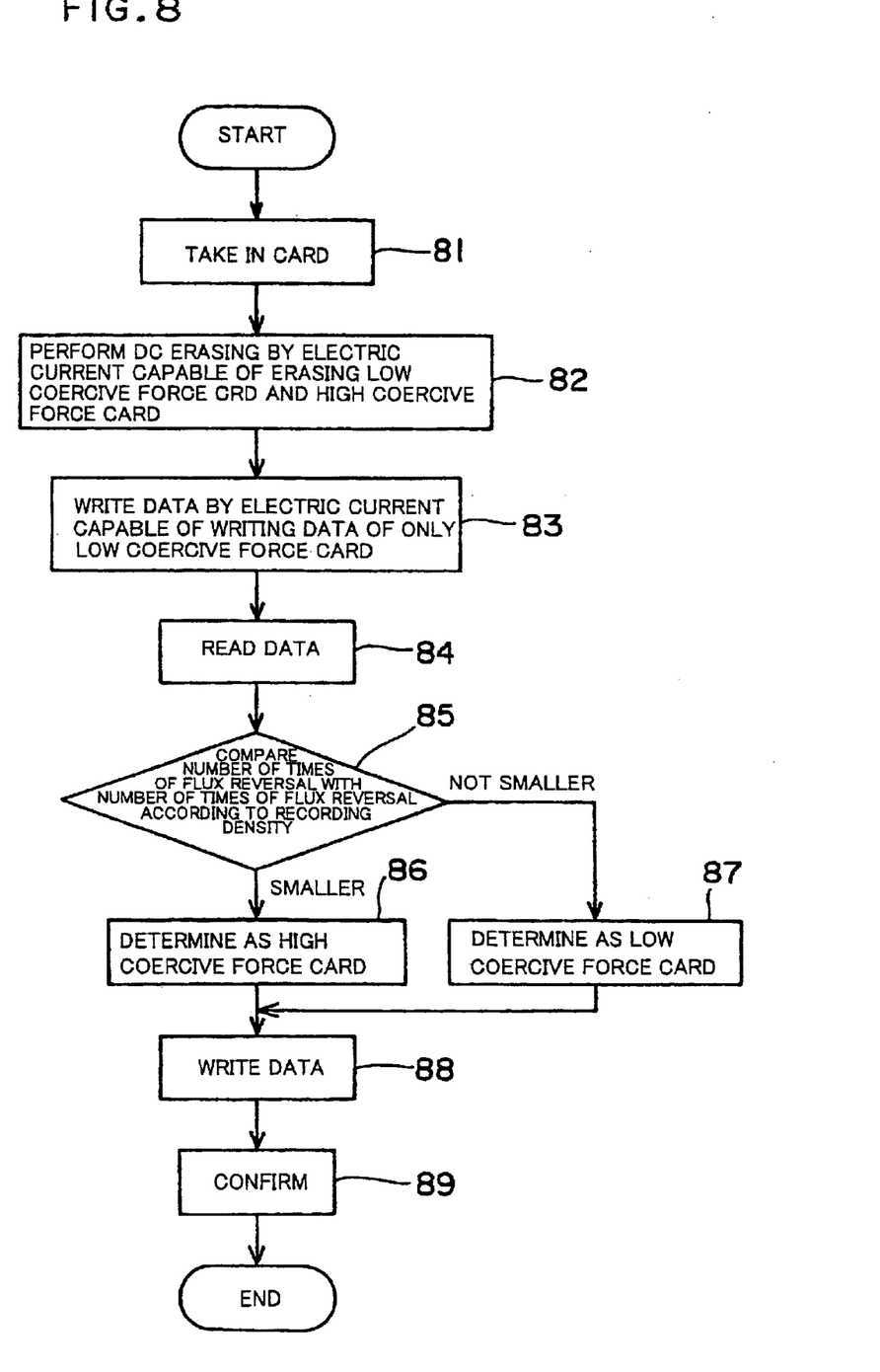
FIG. 8 is a flowchart showing a fifth embodiment of a method for judging coercive force of a magnetic card according to the present invention.

Additionally, although the number of times of flux reversal of the read output is compared with the usual number of times of flux reversal according to the recording density of the magnetic stripe at the step S44 in FIG. 5 and at the step S85 in FIG. 8, it may be compared with a judgment value X determined based on the usual number of times of flux reversal according to the recording density of the magnetic stripe. For example, a value which is approximately ⅓ of the inherent number of times of flux reversal, is used as the judgment value X. In this case, since the number of times of flux reversal is at least about 700 (when all zeros are recorded) in the first track of ISO for example, 230 is used as the judgment value X.

Furthermore, although one magnetic head 3 is used to carry out reading, writing and erasing in the above description, these operations may be performed by separate magnetic heads. In such a case, the processing is enabled by one travel motion of the card.

Moreover, although the original data is not saved before judging the coercive force of the magnetic card, the original data of each channel may be read once and saved in the original data memory 5 before making judgment by using the above-described respective methods if the original data must be saved.

In addition, each of the foregoing methods does not have to be carried out in all the channels. Further, the method for making judgment may be changed in accordance with each channel. For example, the method in FIG. 4 for the channel 1, the method in FIG. 5 for the channel 2 and the method in FIG. 6 for the channel 3 may be simultaneously used to make judgment and the number of items of data to be judged may be increased to improve the accuracy of judgment.

What is claimed is:

1. A method for judging coercive force of a magnetic card for reproducing or recording magnetic information formed on a low coercive force card or a high coercive force card inserted from a card slot by a magnetic head, wherein after rewriting data of said inserted card by an electric current capable of rewriting data of only said low coercive force card, said data of said card is reproduced, and said inserted card is judged as said low coercive force card if said data has been destroyed.

2. A method for judging coercive force of a magnetic card according to claim 1, wherein destruction of said data is judged by a fact that specific data which should be recorded on a predetermined card is not recognized.

3. A method for judging coercive force of a magnetic card for detecting whether a card inserted from a card slot is a low coercive force card and reproducing or recording magnetic information formed on said card by a magnetic head, wherein after rewriting data of said inserted card by an electric current capable of rewriting data of only said low coercive force card, said data of said card is reproduced, and said inserted card is judged as said low coercive force card if said data has been destroyed.

4. A method for judging coercive force of a magnetic card for detecting whether a card inserted from a card slot is a high coercive force card and reproducing or recording magnetic information formed on said card by a magnetic head, wherein after rewriting data of said inserted card by an electric current capable of rewriting data of only said low coercive force card, said data of said card is reproduced, and said inserted card is judged as said high coercive force card if said data has not been destroyed.

5. A method for judging coercive force of a magnetic card according to claim 4, wherein non-destruction of said data is judged by a fact that specific data which should be recorded on a predetermined card is recognized.

6. A method for judging coercive force of a magnetic card for reproducing or recording magnetic information formed on a low coercive force card or a high coercive force card inserted from a card slot by a magnetic head, wherein after erasing data of said inserted card by an electric current capable of erasing data of said low coercive force card and said high coercive force card, data is written by an electric current capable of writing data of only said low coercive force card, and said inserted card is judged as said low coercive force card if a reproduction state is appropriate when said data is reproduced.

7. A method for judging coercive force of a magnetic card according to claim 6, wherein said appropriate reproduction state of said data is judged based on a number of times of flux reversal of said reproduced data or judged by recognition of specific data which should be recorded on a predetermined card.

8. A method for judging coercive force of a magnetic card for detecting whether a card inserted from a card slot is a high coercive force card and reproducing or recording magnetic information formed on said card by a magnetic head, wherein after erasing data of said inserted card by an electric current capable of erasing data of a low coercive force card and said high coercive force card, data is written by an electric current capable of writing data of only said low coercive force card, and said inserted card is judged as said high coercive force card if appropriate reproduction is impossible when said data is reproduced.

9. A method for judging coercive force of a magnetic card according to claim 8, wherein impossibility of appropriate reproduction is determined when a number of times of flux reversal of a reproduction output is smaller than a usual number of times of flux reversal according to recording density of a magnetic stripe.

10. A method for judging coercive force of a magnetic card for detecting whether a card inserted from a card slot is a low coercive force card and reproducing or recording magnetic information formed on said card by a magnetic head, wherein after erasing data of said inserted card by an electric current capable of erasing data of said low coercive force card and a high coercive force card, data is written by an electric current capable of writing data of only said low coercive force card, and said inserted card is judged as said low coercive force card if a reproduction state is appropriate when said data is reproduced.

11. A method for judging coercive force of a magnetic card according to claim 10, wherein said appropriate reproduction state of said data is judged as appropriate when specific data which should be recorded on a predetermined card is recognized.

12. A method for judging coercive force of a magnetic card for reproducing or recording magnetic information formed on a low coercive force card or a high coercive force card inserted from a card slot by a magnetic head, wherein after erasing data of said inserted card by an electric current capable of erasing data of only said low coercive force card, said data of said card is reproduced, and said inserted card is judged as said low coercive force card if said data has been destroyed, and wherein destruction of said data is judged based on a number of times of flux reversal of said reproduced data or judged by a fact that specific data which should be recorded on a predetermined card is not recognized.

13. A method for judging coercive force of a magnetic card for detecting whether a card inserted from a card slot is a low coercive force card and reproducing or recording magnetic information formed on said card by a magnetic head, wherein after erasing data of said inserted card by an electric current capable of erasing data of only said low coercive force card, said data of said card is reproduced, and said inserted card is judged as said low coercive force card if said data has been destroyed, and wherein destruction of said data is judged-based on a number of times of flux reversal of said reproduced data or judged by a fact that specific data which should be recorded on a predetermined card is not recognized.

* * * * *